Dec. 12, 1933.    R. F. GOECKE    1,939,495
TANK AND VALVE FITTING THEREFOR
Filed Oct. 28, 1931    2 Sheets-Sheet 1

INVENTOR
Rudolph F. Goecke
BY
his ATTORNEY

Dec. 12, 1933.  R. F. GOECKE  1,939,495
TANK AND VALVE FITTING THEREFOR
Filed Oct. 28, 1931   2 Sheets-Sheet 2
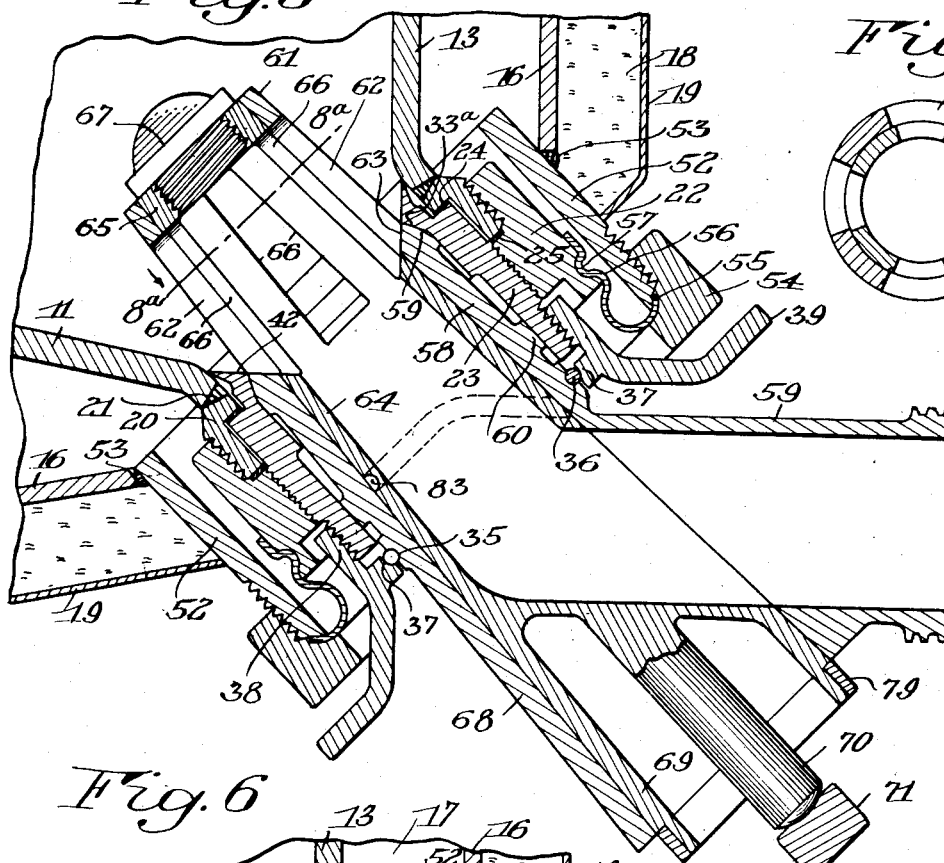
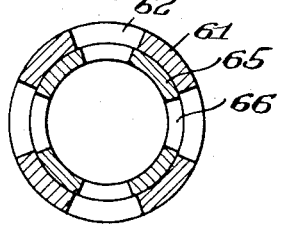
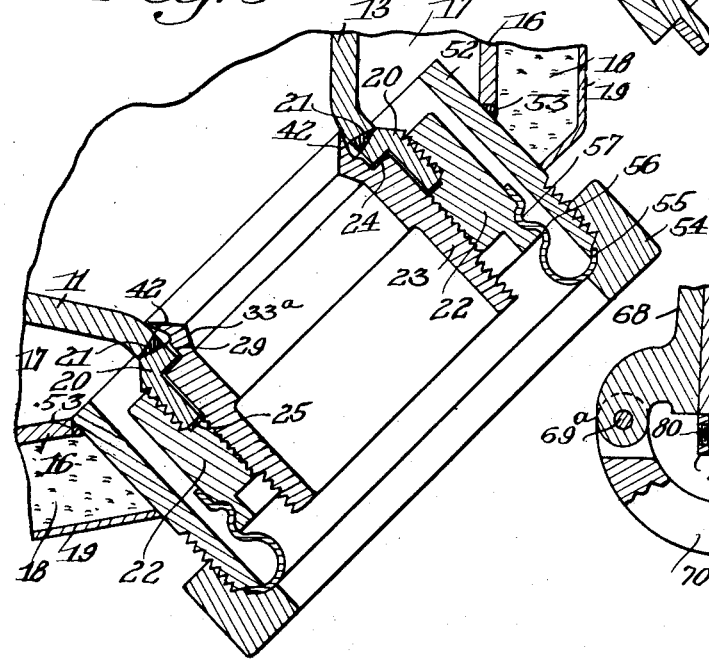
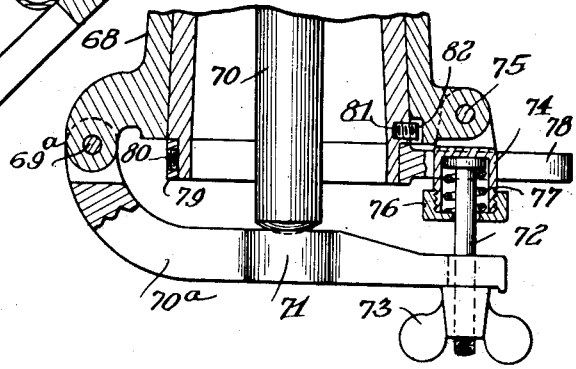
INVENTOR
Rudolph F. Goecke
BY Edward H. Crumpton
his ATTORNEY Patented Dec. 12, 1933

1,939,495

UNITED STATES PATENT OFFICE 1,939,495

TANK AND VALVE FITTING THEREFOR

Rudolph F. Goecke, Elyria, Ohio, assignor to The Pfaudler Co., Rochester, N. Y., a corporation of New York Application October 28, 1931. Serial No. 571,699

16 Claims. (Cl. 137—21)

The present invention relates to improvements in liquid holding tanks and to valve fittings therefor, and particularly to tanks used in the pasteurization or treatment of milk or other liquid food products.

The invention has for one object to provide an improved tank of this class constructed in a manner to facilitate complete drainage of the liquid therefrom and further has for its object to provide an improved method of constructing the tank and of forming a discharge outlet thereon which will facilitate the complete drainage of the liquid upon opening the valve controlling the outlet.

A further object of the invention is to provide an improved valve fitting for the outlet and particularly one which can be installed and operated in considerably less space than has been possible with other types of valves heretofore provided for this purpose, and one which is adjustable to facilitate its removal when applied to the bottoms of tanks located relatively close to the floor, or in other relatively inaccessible positions.

A further object of the invention is to provide an improved valve fitting for tank outlets having comparatively few parts which are of simple construction, relatively inexpensive to manufacture and which are easy to assemble and adjust or to remove for cleaning from time to time.

A further object of the invention is to provide improvements in valve fittings of the present class which will facilitate varying the direction of the flow of the drain outlet of the tank whereby to accommodate the parts to different supply or discharge connections to be attached to the outlet.

A further object of the invention is to provide an improved pasteurizing or milk treating tank having a discharge nipple formed thereon at a point of intersection of two of the sides of the tank and extending between substantially vertical and horizontal positions and arranged to rotatably receive a valve controlled drain-tube of angular construction so that the angularity of the discharge end of the tube may be readily varied with respect to the tank to facilitate its removal from the tank as well as to accommodate it to different tank installations.

A further object of the invention is to provide in combination with a tank having a laterally projecting discharge nipple at the intersection of two sides of the tank, an improved valve arrangement in which the outlet is closed by the valve at a point adjacent the receiving end of the nipple and in which the portion of the outlet leading to the valve seat is so arranged as to facilitate drainage of the liquid from the surrounding wall portions of the tank.

A further object of the invention is to provide an improved valve fitting for tank outlets which is constructed to interchangeably receive different types of valves.

To these and other ends the invention resides in certain improvements and combinations of parts, all as will be hereinafter more fully described, the novel features being pointed out in the claims at the end of the specification.

In the drawings:

Fig. 5 is an enlarged sectional elevation showing a modified valve construction;

Fig. 6 is a view similar to Figs. 4 and 5 with the valve and drain tube removed;

Fig. 7 is a fragmentary elevation illustrating one form of retaining means for the valve shown in Fig. 5;

Fig. 8 is a transverse section taken on the line 8a—8a of Fig. 5, and

Similar reference numerals indicate the same parts throughout the several views.

Figure 1:
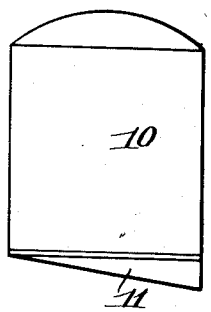
Fig. 1 is a somewhat diagrammatic view in elevation of an improved tank drawn to a reduced scale and to which the valve fitting is to be attached.

Referring to the drawings, 10 represents a tank or container having at its lower end a head provided with a depressed trough-like portion 11 inclined to the horizontal to insure proper draining of the liquid through the discharge opening 12 located at a point of intersection of the inclined wall with the vertical wall 13, said opening having a surrounding nipple 14 with its axis extending at an angle to each of the two sides 11 and 13 of the tank or between a substantially vertical and horizontal position. The tank is preferably of cylindrical construction but may be otherwise formed if desired.

Figure 2:
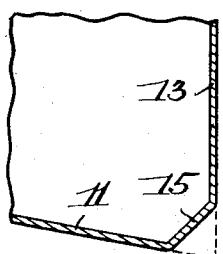
Fig. 2 is a fragmentary sectional elevation of the tank drawn to an enlarged scale and showing the first step in the formation of the nipple at the intersection of two sides of the tank.
Figure 3:
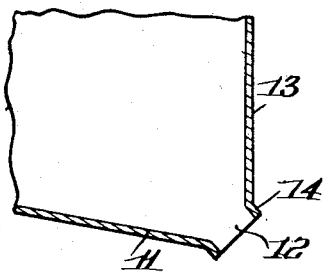
Fig. 3 is a fragmentary sectional elevation showing the nipple surrounding the discharge opening of the tank.

The method of forming the laterally projecting nipple comprises forcing inwardly at any suitable point of intersection of the sides 11 and 13, a portion of each, to afford o flattened or connecting wall portion 15 between the sides, which is inclined relative to each as shown in Fig. 2. An opening of less diameter than the outlet opening 12 is then formed in the flattened portion 15, after which a suitable tool is employed to swedge or force outwardly the material surrounding the opening whereby to provide the extended nipple 14 as shown in Fig. 3. It will be seen, therefore, that the nipple is formed of material originally constituting portions of the two sides 11 and 13 of the tank and that the nipple, or the axis thereof, extends at an angle to each of said sides. The outlet opening is, therefore, disposed at the lowest point of the tank whereby to insure complete drainage of the liquid therefrom upon opening the valve for controlling the outlet.

The tank is preferably surrounded by a jacket forming wall 16 affording a space 17 for the circulation of the heating or cooling fluids generally employed with apparatus of the present type. The jacket wall is preferably surrounded by suitable insulation 18, as for example cork, which is protected and enclosed by an outer wall 19.

Figure 4:
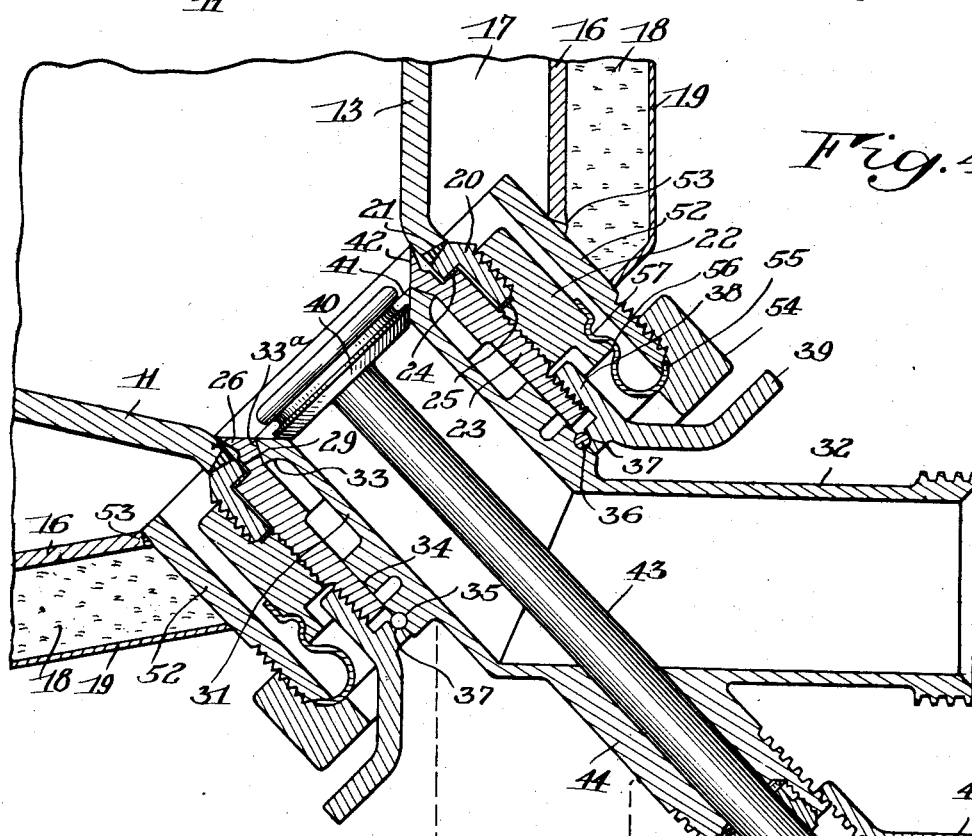
Fig. 4 is an enlarged sectional elevation showing the valve and valve fittings as applied to the nipple.

A threaded extension 20 is suitably connected with the nipple 14 as for example by welding as indicated at 21 in Figs. 4, 5, and 6. Threadedly connected with the nipple extension is a collar or ring 22 which is also interiorly threaded to receive a bushing 23. A washer 24 is interposed between the bushing and the extension 20 of the nipple to afford a liquid tight joint between these parts. Likewise a washer 25 is interposed between the collar 22 and the lower extremity of the nipple extension 20 to seal the joint between said parts.

Figure 9:
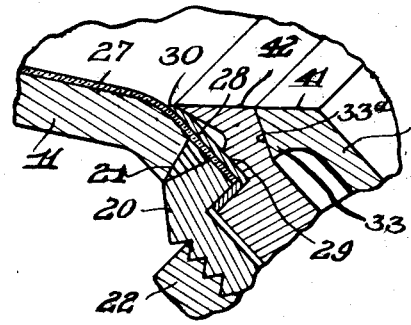
Fig. 9 is a part sectional elevation illustrating the manner of forming a fluid tight joint between a portion of the wall surrounding the tank outlet and a bushing inserted within the outlet.

The bushing 23 is extended within the nipple and is provided with an outwardly flared portion 26 which terminates in a feather-like edge encircling the inner end of the outlet opening substantially at a point opposite what may be termed the base of the nipple. In order to afford a sealed joint between the flared portion of the bushing and the enamel 27 on the inner face of the tank, an annular washer 28 formed of relatively soft material such for example as tin is interposed between the enamel and the inner end of the bushing and is extended to a point slightly above the feather-like edge of the bushing at one end and downwardly around the shoulder portion 29 of the bushing at the other end as indicated in Fig. 9. The washer is attached to the inner end of the bushing before insertion of the latter within the nipple and the sealing of the joint 30 is then completed by forcing the extreme edge of the flared portion of the bushing outwardly into close contact with the soft metal of the washer, as by peening or corking so that the joint is rendered leak-proof to prevent the escape of liquid at this point.

Inserted within the bushing is the inner end 31 of the drain tube the outer or discharge end 32 of which extends at an angle to the inner end, the tube being rotatable within the bushing for a purpose hereinafter set forth. The inner extremity 33 of the tube engages a seat 33a on the bushing, a ground joint being formed between these parts to afford a seal between the same for preventing the escape of the liquid through the joint. The inner portion of the tube is also provided with an annular bearing 34 rotatably received by and closely fitting the surrounding wall of the bushing whereby the tube is held in proper alinement within the bushing. The inner end portion 31 of the tube is provided with a groove 35 in which is disposed a split ring 36 engaging a shoulder 37 on a nut 38 threaded upon the lower end of the bushing as shown in Figs. 4 and 5. The nut is provided with a hand grip portion 39 by which it is turned to and from securing position, it being understood that the pressure exerted by the nut on the split ring serves to hold the tube in adjusted position within the bushing with the bearing portion 33 of the tube urged into engagement with the seat 33a on the bushing. If it is desired to effect removal of the tube it is only necessary to unscrew the nut, after which the tube can be detached by a downward movement thereof. If, however, it is merely desired to rotate the tube within the bushing between the full and dotted line positions shown in Fig. 5, the nut is loosened sufficient to relieve the pressure between the end portion 33 of the tube and the seat 33a of the bushing.

Located at the inner end of the tube is a valve 40 preferably of the poppet type which engages a valve seat 41 on the extremity of the bushing, said seat being substantially in the plane of and constituting a continuation of the inclined face portion 42 of the bushing, the latter being disposed somewhat inwardly of the portion of the wall surrounding the tank outlet to insure proper draining of the liquid into the receiving end of the bushing for discharge through the valve when the latter is opened.

The stem 43 of the valve is projected through a sleeve-like portion 44 on the outer end 32 of the drain tube as shown in Fig. 4. Packing 45 surrounds the stem within the sleeve and is compressed therein by a nut 46. A longitudinal movement of the valve stem to open and close the valve is effected by a hand wheel 47 which is threaded upon the end of the sleeve 44 and which is free to turn upon the sleeve. The wheel operates to advance or retract the valve stem, depending upon the direction in which the hand wheel is turned. The stem is extended through the transverse portion 48 of the wheel and is normally held against removal by a pin 49 extending through the stem. A nut 50 is threaded within a boss 51 on the transverse portion 48 of the wheel and serves to exert pressure on the stem in the direction of the valve when the hand wheel is advanced toward the sleeve 44 by turning it in one direction. To remove the valve from the drain tube the nut 50 is unscrewed after which the hand wheel is advanced on the sleeve 44 far enough to permit the pin 49 to assume a position outside of the boss 51 where it can be detached from the stem. The valve can then be withdrawn from the drain tube by moving it longitudinally therein. It will be seen, therefore, that the detachable parts of the valve fitting can be quickly removed from time to time for cleaning, first by unscrewing the nut 38 to permit the drain tube and the valve thereon to be withdrawn, after which the valve can be detached as described above. After removal of the drain tube, a hose may be conveniently inserted through the opening in the bushing to discharge a suitable cleaning fluid within the tank, by which it can be thoroughly washed out from time to time. Furthermore, the tank may also be cleaned by using a swab therein which can also be inserted through the opening in the bushing after removal of the drain tube.

Surrounding the collar 22 of the valve fitting is a cylindrical member 52 which is connected with the wall 16 of the jacket preferably by welding as indicated at 53 in Figs. 4, 5, and 6, whereby a liquid tight joint is afforded between these parts. The cylindrical member 52 is spaced from the collar 22 and has threaded on its lower end a nut 54 which serves to clamp the annular flange 55 of a ring-shaped member 56 on the lower end of the cylindrical member to form a liquid tight joint between said flange and said end. The annular ring-shaped member 56 is connected with the collar 22 in a manner to form a liquid tight joint so that the liquid within the jacket 17 cannot escape through the valve fitting. The collar 22 is preferably grooved to receive the ring 56 as shown in Figs. 4, 5, and 6, the bead 57 of the ring being preferably spun within the groove of the collar and if desired, it may be brazed upon or welded to the collar.

The arrangement shown in Fig. 5 is the same as that embodied in Fig. 4 with the exception that a different type of valve is employed which necessitates a somewhat modified form of drain tube. In this case the inner end portion of the drain tube is indicated at 58 and the outer end, which is disposed at an angle thereto, is shown at 59. The inner extremity of the tube is provided with a shoulder 59 engaging the seat 33a on the bushing 23 which is the same as that shown in Fig. 4. The tube portion 58 is provided with an annular bearing 60 rotatably received within and closely fitting the bore of the bushing whereby the tube is held properly alined within the bushing. The tube has an extended portion 61 which is provided with a series of inlet openings 62 terminating at their lower ends in the downwardly inclined faces 63 which are substantially co-extensive with the inclined face 42 of the bushing whereby to afford a smooth outlet surface for the flow of the liquid from the tank opening to the hollow valve 64 rotatably disposed within the tube. The valve has an extended portion 65 projecting within the extended portion 61 of the tube and provided with openings 66 arranged to register with the openings 62 of the valve in one position thereof as shown in Fig. 8. The bore of the valve is closed at its inner end by a screw cap 67 as shown in Fig. 5, which when removed renders the interior of the valve accessible for cleaning. A sleeve-like portion 68 is formed on the drain tube to afford a seat for the lower end portion 69 of the valve which has a centrally disposed stem 70 positioned therein.

Pivotally connected to the sleeve 68 at 69a is an arm 70a having a seat 71 engaging the lower end of the stem 70 as shown in Fig. 7. The arm is held in position to support the valve by means of a bolt 72 having a wing nut 73 on its lower end engaging the outer end of the arm. The bolt is extended within an inverted cup-shaped member 74 pivotally connected with the sleeve 68 at 75. The cup-shaped member is provided with a closure 76 between which and the head of the bolt is a spring 77 operating through the bolt and arm to yieldingly urge the valve upon its seat which constitutes the inner tapered surface of the drain tube. The arm 70a is preferably slotted at its free end to permit insertion therein and withdrawal therefrom of the bolt by a swinging movement of the latter upon loosening the nut on the lower end of the bolt.

Rotation of the valve to and from closing position is effected by a handle 78 extending from a ring 79 encircling the lower end portion of the valve and secured thereon by a set screw 80. The valve is held against rotation at its limits of movement by a set screw 81 operating within a groove 82 formed in the sleeve 68, the screw engaging abutments at the opposite end of the groove, not shown, when the valve is moved to and from closed position.

In order to provide means for discharging any liquid which may find its way between the valve and the tube in which it rotates, a peripheral groove 83 is formed in the outer surface of the valve which is arranged to discharge through a suitable opening in the drain tube, not shown, when the valve is in closed position.

The discharge end of each drain tube is preferably threaded as shown in Figs. 4 and 5 to receive a suitable connection, not shown, for conveying the liquid from the tank and for discharging fluid into the latter under pressure when desired.

It will be seen from Fig. 6 that the parts of the valve fitting shown therein are common to the disclosures in Figs. 4 and 5 and that the valve and the drain tubes in which they are mounted may be interchangeably employed in connection with the parts shown in Fig. 6. This arrangement, therefore, permits of the use of different types of valves in the same mounting, two of which are disclosed.

One advantage of forming the discharge nipple at the intersection of two sides of the tank to extend between substantially vertical and horizontal positions, is that the discharge end of the drain tube can be adjusted to either a horizontal or vertical position merely by rotating the tube from one position to another. If, for example, it is desired to have the tube occupy the dotted line position in Fig. 4, it might not be possible to remove it from the mounting in this position if it extended relatively close to the floor line. However, in such a case it could be readily removed after adjustment to the full line position of said figure by rotating it about the axis of the valve stem, the position of which does not vary relative to the tank outlet. This is also true with respect to the valve arrangement shown in Fig. 5.

It will be noted that the valve seat and the inclined face portion of the bushing lying between the valve seat and the wall 11 of the tank are slightly below the plane of said wall whereby to insure complete draining of the liquid from the tank into the discharge outlet. Furthermore, the valve is disposed substantially flush with the inner end of the tank outlet so that there is no pocket in which the liquid can accumulate while the valve remains closed.

With the present valve fitting a liquid tight joint is not only afforded between the tank outlet and the valve supporting parts, but an additional liquid tight joint is afforded between certain of the parts and the wall of the jacket surrounding the tank.

With the present valve fitting the weight of the parts has been greatly reduced as well as the number of parts and the cost of manufacture has likewise been reduced to a minimum.

I claim:

1. In apparatus of the class described, a tank having at a point of intersection of its bottom wall and one of its vertical sides a laterally projecting integrally formed nipple affording an opening in the wall of the tank and extending at an angle to said bottom and said vertical side, a drain tube extending within the nipple having an interiorly formed beveled face substantially flush with the portion of the wall of the tank directly surrounding the base of the nipple, a valve seated in said nipple upon said beveled face, and operating means for controlling the valve.

2. In apparatus of the class described, a tank having at a point of intersection of two of its sides a laterally projecting integrally formed nipple affording an opening in the wall of the tank and having its axis extending at an angle to each of the two sides, a bushing extending within and connected with the nipple and having an interiorly formed beveled face substantially flush with and forming a continuation of the portion of the wall of the tank directly surrounding the base of the nipple, a drain tube extending within the bushing and having a beveled seat substantially flush with the beveled face of the bushing, and a valve adjustable on the seat for controlling the opening.

3. In apparatus of the class described, a tank having at a point of intersection of two of its sides, a laterally projecting nipple affording an opening in the wall of the tank and extending at an angle to each of the two sides, a drain tube having inner and outer divergent end portions the inner end portion being rotatably supported within the nipple whereby to vary the angularity of the outer end portion with respect to the tank upon rotation of the tube, and a valve adjustable within the nipple to control the flow of liquid through the tube.

4. In apparatus of the class described, a tank having at a point of intersection of two of its sides a laterally projecting nipple affording an opening in the wall of the tank, a bushing fitted within the nipple, a drain tube having inner and outer divergent end portions the inner end portion being rotatably received within the nipple whereby to vary the angularity of the outer end portion relative to the tank upon rotation of the tube, a supporting element for the tube connected with the bushing and being detachable therefrom to permit outward withdrawal of the tube from the bushing, and a valve adjustable at the inner end of the tube to control the flow of the liquid through the tube.

5. In apparatus of the class described, a tank having a discharge opening formed in its wall at the intersection of two of its sides and extending at an angle to each of the two sides, a drain tube comprising divergent receiving and discharge portions, the receiving portion being rotatably mounted in said discharge opening and provided with a seat, and a valve engaging said seat and having an outwardly extending operating part, said drain tube being rotatable about the axis of said receiving portion whereby to vary the angularity of the outlet portion with respect to the tank.

6. In apparatus of the class described, a tank having a nipple formed upon its wall to afford an outlet, a bushing connected with the nipple, a drain tube having divergent receiving and discharge portions, the receiving portion being rotatably mounted in said bushing and having a valve seat adjacent its inner end, a valve engaging the seat and having an outwardly extending operating part, a split ring encircling the tube within a groove formed therein, and a supporting member for the tube detachably connected with the bushing and having a shoulder engaging the ring.

7. In apparatus of the class described, a liquid holding tank having an outlet, a bushing extending within the outlet the inner end of the bushing engaging the portion of the wall of the tank surrounding the outlet and having a liquid tight joint-connection therewith, said bushing end having an interiorly formed beveled face thereon substantially flush with the portion of the wall of the tank directly surrounding said end to facilitate drainage of the liquid, means detachably connecting the bushing with the tank, a drain tube having inner and outer divergent end portions the inner end portion being rotatably received within the bushing whereby to vary the angularity of the outer end portion with respect to the tank, a member detachably connecting the tube with the bushing and affording a bearing upon which the tube is adapted to rotate, a valve at the inner end of the tube for closing the latter, said valve having a stem extending through the wall of the outer divergent end of the tube, and means for moving the stem inwardly to move the valve inwardly from its seat.

8. In apparatus of the class described, a liquid holding tank having a nipple thereon forming an outlet, a bushing extending within the nipple and having an interiorly formed beveled face at its inner end to facilitate drainage of the liquid from the tank, a drain tube rotatably mounted within the bushing and comprising divergent receiving and discharge portions the receiving end of the tube having a beveled face substantially flush with and forming a continuation of the beveled face of the bushing, a valve seated on one of said beveled faces and having a stem extending outwardly through the wall of the tube, and means connected with the valve stem and adjustable to move the valve inwardly from its seat.

9. In apparatus of the class described, a liquid holding tank having a nipple thereon forming an outlet, a bushing extending within the nipple and having an interiorly formed beveled face at its inner end to facilitate drainage of the liquid from the tank, a drain tube mounted within the bushing the inner extremity of the tube having a beveled face substantially flush with and forming a continuation of the beveled face of the bushing, means detachably connected with the bushing for securing the tube therein, a valve for closing the inner end of the tube seated upon the beveled face thereof and having an operating stem extending outwardly through the tube, and means for moving the stem inwardly to move the valve inwardly from its seat.

10. In apparatus of the class described, a liquid holding tank having a nipple thereon forming an outlet, a bushing extending within the nipple and having an interiorly formed beveled face at its inner end to facilitate drainage of the liquid from the tank, a drain tube mounted within the bushing the inner extremity of the tube having a beveled face substantially flush with and forming a continuation of the beveled face of the bushing, said bushing having a seat adjacent its beveled face forming a bearing upon which the inner end of the tube is seated, means detachably securing the tube within the bushing, a valve for closing the tube seated upon one of said beveled faces and having an operating stem extending outwardly through the wall of the tube, and means for moving said stem inwardly to move the valve from its seat.

11. In apparatus of the class described, a liquid holding tank having a nipple thereon forming an outlet for the tank and having an interiorly formed shoulder, a bushing extending within the nipple and seated upon the shoulder, an annular member connected with the nipple and serving to secure the bushing therein, a drain tube having inner and outer divergent end portions the inner end portion being rotatably received within the bushing whereby to vary the angularity of the outer end portion with respect to the tank, said tube having a valve seat at its inner end, a valve upon said seat having a stem extending through the wall of the outer divergent portion of the tube, means adjustable upon said wall and engaging the stem to effect movement of the same whereby to move the valve inwardly from its seat, and a detachable connection on the outer end of the bushing serving to rotatably support the tube within the bushing, said tube and the valve and stem being detachable from the bushing as a unit upon removing said connection.

12. In apparatus of the class described, a liquid holding tank having a nipple thereon forming an outlet, a bushing secured within the nipple and having a bearing adjacent its inner end, a drain tube having inner and outer divergent end portions the inner end portion extending within the bushing and being seated upon said bearing for rotation thereon, a retaining member for the tube detachably connected with the bushing and having a bearing upon which the tube is free to rotate to vary the angular relationship of the outer end of the tube with respect to the tank, a valve seated on the inner end of the tube and having a stem extending through the wall of the tube, and means on said wall for moving the stem inwardly to move the valve inwardly from its seat, said tube and the valve and stem being removable from the bushing as a unit upon detaching said retaining member.

13. In apparatus of the class described, a tank having a nipple thereon forming an outlet, a bushing within the nipple, a jacket forming wall for the tank spaced therefrom and having an opening substantially co-axial with and of a larger diameter than the nipple, a collar surrounding the bushing and connected with the nipple to secure the bushing therein, an annular member surrounding the collar and connected with the portion of the jacket surrounding the opening therein, a ring-shaped member serving to close the opening between the outer ends of the collar and the annular member, a drain tube extending within the bushing, a retaining member for the drain tube detachably secured upon the outer end of the bushing, a valve seated upon the inner end of the drain tube and having an outwardly projecting operating stem, and means for operating the stem to unseat the valve.

14. In apparatus of the class described, a tank having a nipple forming an outlet, a bushing extending within the nipple and having a shoulder formed interiorly thereof, a collar connected with the nipple and serving to secure the bushing therein, a jacket forming wall for the tank spaced therefrom and having an opening alined with the outlet, an annular member surrounding the collar in spaced relation thereto and having a liquid tight joint-connection with the portion of the jacket wall surrounding the opening therein, means serving to close the opening between the annular member and the collar, a drain tube secured within the bushing in engagement with the shoulder thereof, a valve at the inner end of the drain tube for closing the latter having an outwardly projecting stem, and means for moving the stem to unseat the valve.

15. In apparatus of the class described, a tank having a nipple forming an outlet, a bushing adapted to receive a drain tube, said bushing extending within the nipple and having a shoulder formed interiorly thereof to afford a bearing for the drain tube, a collar connected with the nipple and serving to secure the bushing therein, a jacket forming wall for the tank spaced therefrom and having an opening alined with the outlet, an annular member surrounding the collar in spaced relation thereto and having a liquid tight joint-connection with the portion of the jacket wall surrounding the opening therein, and means serving to close the opening between the annular member and the collar.

16. In apparatus of the class described, a tank having a nipple thereon forming an outlet and provided with an interiorly formed shoulder, a bushing extending within the nipple and seated upon the shoulder, a collar connected with the nipple and serving to urge the bushing in engagement with the shoulder, a jacket forming wall for the tank spaced therefrom and having an opening alined with the outlet, an annular member surrounding the collar in spaced relation thereto and connected with the portion of the jacket wall surrounding the opening therein, a ring shaped member interposed between the annular member and the collar and serving to close the opening between the latter and the annular member, and a part serving to secure the ring shaped member upon the annular member detachably connected with the latter.

RUDOLPH F. GOECKE.